(12) United States Patent
Wang et al.

(10) Patent No.: US 9,841,845 B2
(45) Date of Patent: Dec. 12, 2017

(54) TOUCH SCREEN, POSITIONING METHOD THEREOF AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Huan Wang, Beijing (CN); Mookeun Shin, Beijing (CN); Zhizhong Tu, Beijing (CN); Yong Jun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 14/779,164

(22) PCT Filed: Nov. 24, 2014

(86) PCT No.: PCT/CN2014/092066
§ 371 (c)(1),
(2) Date: Sep. 22, 2015

(87) PCT Pub. No.: WO2016/029574
PCT Pub. Date: Mar. 3, 2016

(65) Prior Publication Data
US 2016/0306498 A1    Oct. 20, 2016

(30) Foreign Application Priority Data
Aug. 28, 2014   (CN) .......................... 2014 1 0432053

(51) Int. Cl.
*G06F 3/042* (2006.01)
*G09G 3/36* (2006.01)
*G02F 1/00* (2006.01)

(52) U.S. Cl.
CPC .............. *G06F 3/0421* (2013.01); *G02F 1/00* (2013.01); *G09G 3/3696* (2013.01)

(58) Field of Classification Search
None
See application file for complete search history.

(56) References Cited

U.S. PATENT DOCUMENTS

2011/0148810 A1   6/2011   Kitada et al.
2013/0075765 A1   3/2013   Ye et al.

FOREIGN PATENT DOCUMENTS

CN           2466703 Y      12/2001
CN         101149656 A       3/2008
(Continued)

OTHER PUBLICATIONS

First Chinese Office Action dated Sep. 29, 2016; Appln. No. 201410432053.0.
(Continued)

*Primary Examiner* — Kenneth B Lee, Jr.
(74) *Attorney, Agent, or Firm* — Ladas & Parry LLP (57) ABSTRACT

A touch screen, a positioning method thereof and a touch display device. The touch screen includes a touch area; a plurality of emitters disposed on a first side of the touch area; a plurality of receivers disposed on a second side of the touch area opposite to the first side of the touch area; and direction changing units disposed in the light ray-emitting directions of at least part of the emitters and configured to change emitting directions of light rays emitted by the emitters so that the light rays with different emitting directions are emitted at different time periods and the light rays
(Continued)

with the different emitting directions are received by different receivers. The touch screen has an increased resolution.

11 Claims, 5 Drawing Sheets

(56) References Cited

FOREIGN PATENT DOCUMENTS

| CN | 101430441 A | 5/2009 |
|----|-------------|--------|
| CN | 101995998 A | 3/2011 |
| CN | 102004586 A | 4/2011 |
| CN | 202257517 U | 5/2012 |
| CN | 202257520 U | 5/2012 |
| CN | 202736002 U | 2/2013 |
| CN | 203561971 U | 4/2014 |

OTHER PUBLICATIONS

International Search Report and Written Opinion both dated May 19, 2015; PCT/CN2014/092066.
Third Chinese Office Action dated Mar. 23, 2017; Appln. No. 201410432053.0.
Second Chinese Office Action dated Nov. 29, 2016; Appln. No. 201410432053.0.
The Fourth Chinese Office Action dated Aug. 28, 2017; Appln. No. 201410432053.0.

TOUCH SCREEN, POSITIONING METHOD THEREOF AND TOUCH DISPLAY DEVICE

TECHNICAL FIELD

Embodiments of the present disclosure relate to a touch screen, a positioning method thereof and a touch display device.

BACKGROUND

Infrared touch technology has been widely used in various fields gradually due to its advantages, such as high stability and reliability. An infrared touch screen generally includes two sets of infrared transmitting tubes and two sets of infrared receiving tubes. A lateral infrared transmitting tube and a lateral infrared receiving tube determine the ordinate of a touch point, and a longitudinal infrared transmitting tube and a longitudinal infrared receiving tube determine the abscissa of the touch point, so as to realize positioning of the touch point. Since each of the infrared transmitting tubes only emits a beam of infrared light and each of the infrared receiving tube only receives a beam of infrared light, the resolution of the touch screen is low.

SUMMARY

According to at least one embodiment of the present disclosure, there is provided a touch screen, a positioning method thereof and a touch display device for addressing the problem of low resolution of the touch screen.

According to at least one embodiment of the present disclosure, there is provided a touch screen, comprising a touch area, a plurality of emitters disposed on a first side of the touch area, a plurality of receivers disposed on a second side of the touch area opposite to the first side of the touch area, and direction changing units disposed in the light ray-emitting directions of at least part of the emitters, wherein the emitter is configured to emit light ray; the direction changing unit is configured to change emitting directions of the light rays emitted by the emitter so that the light rays with different emitting directions are emitted at different time periods and the light rays with the different emitting directions are emitted to a different receiver, and the receivers are configured to receive the light rays emitted by the emitters.

For example, the emitters are further disposed on a third side of the touch area, and the receivers are further disposed on a fourth side of the touch area opposite to the third side.

For example, the direction changing unit comprises a first substrate and a second substrate which are oppositely disposed, wherein a first electrode is disposed on the first substrate, a second electrode is disposed on the second substrate, a light transmitting layer and a liquid crystal layer are disposed between the first substrate and the second substrate, and the contact surface of the light transmitting layer and the liquid crystal layer is not parallel to the second substrate.

For example, the light rays emitted by the emitter include first polarized light rays which are perpendicular to the plane of the touch area and second polarized light rays which are parallel to the plane of the touch area.

For example, when a first voltage is applied between the first electrode and the second electrode, the first polarized light rays and the second polarized light rays pass through the liquid crystal layer without any refraction occurring on the contact surface of the liquid crystal layer and the light transmitting layer, and directly transmit through the light transmitting layer, or when a second voltage is applied between the first electrode and the second electrode, the first polarized light rays pass through the liquid crystal layer with refraction occurring on the contact surface of the liquid crystal layer and the light transmitting layer, and the refracted first polarized light rays pass through the light transmitting layer, the second polarized light rays pass through the liquid crystal layer without any refraction occurring on the contact surface of the liquid crystal layer and the light transmitting layer, and directly transmit through the light transmitting layer.

For example, when the first voltage is applied between the first electrode and the second electrode, the refractive index of the light transmitting layer is the same as the refractive index of the liquid crystal layer.

For example, when the second voltage is applied between the first electrode and the second electrode, liquid crystal molecules in the liquid crystal layer are deflected at a plane which is perpendicular to the touch area in order to change the refractive index of the liquid crystal layer.

For example, a material of the light transmitting layer comprises polymethylacrylate or polycarbonate.

According to at least one embodiment of the present disclosure, there is further provided a touch display device comprising any of touch screens as described above.

According to at least one embodiment of the present disclosure, there is further provided a positioning method for a touch screen comprising a touch area, a plurality of emitters disposed on a first side of the touch area, a plurality of receivers disposed on a second side of the touch area opposite to the first side of the touch area, and direction changing units disposed in the Is of at least part of the emitters, the positioning method comprising: determining whether a light ray is blocked and, if the light ray is blocked, determining a path of the blocked light ray; calculating coordinates of at least one of intersections between blocked light rays from the determined paths of the blocked light rays and determining a position of a touch point from the coordinates of the at least one of intersections.

For example, a calculating formula for calculating the coordinates of the intersections of the blocked light rays from the determined paths of the blocked light rays is:

$$x = \frac{ad - bc}{a - b - c + d}$$
$$y = \frac{an - bn - cm + dm}{a - b - c + d}$$

where the coordinates of the intersection is (x, y), the coordinates of the emitter corresponding to one of paths of the blocked light rays is (a, m), the coordinates of the corresponding receiver is (c, n), the coordinates of the emitter corresponding to other of paths of the blocked light rays is (b, m), the coordinates of the corresponding other receiver is (d, n), with a−b−c+d≠0.

For example, a calculating formula for calculating the coordinates of the intersections of the blocked light rays from the determined paths of the blocked light rays is:

$$x = \frac{an - bn - cm + dm}{a - b - c + d}$$

$$y = \frac{ad - bc}{a - b - c + d}$$

where the coordinates of the intersection is (x, y), the coordinates of the emitter corresponding to one of paths of the blocked light rays is (m, a), the coordinates of the corresponding receiver is (n, c), the coordinates of the emitter corresponding to other of paths of the blocked light rays is (m, b), the coordinates of the corresponding other receiver is (n, d), with a−b−c+d≠0.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the present disclosure. Based on the described embodiments herein, those skilled in the art can obtain all of other embodiments, without any inventive work, which should be within the scope of the invention.

Unless otherwise defined, all technical and scientific terms used herein have the same meanings as commonly understood by one of ordinary skill in the art to which the present invention belongs. The terms, such as "first", "sec-ond", or the like, which are used in the description and the claims of the present application, are not intended to indicate any sequence, amount, or importance, but for distinguishing various components. Also, the terms, such as "a/an", "one", "the/said", or the like, are not intended to limit the amount, but for indicating the existence of at lease one. The terms, such as "on", "under", "left", "right", or the like, are only configured to indicate relative position relationship, and when the absolute position of the object which is described is changed, the relative position relationship may be changed accordingly.

First Embodiment

Figure 1:
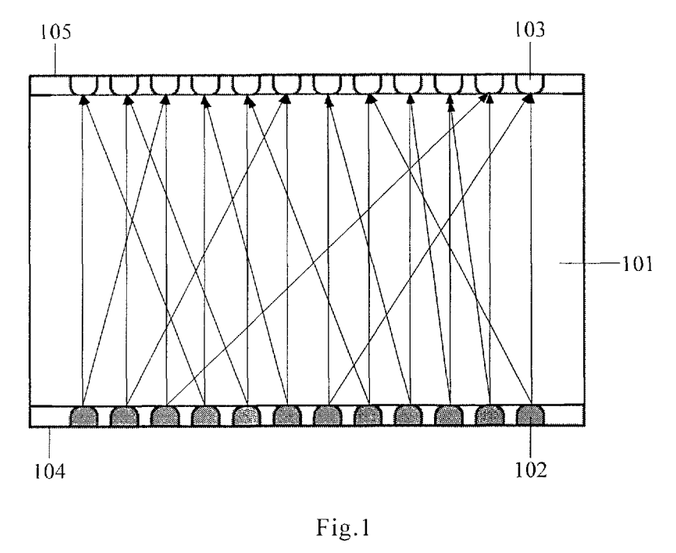
FIG. 1 is a schematic diagram of a configuration of a touch panel according to an embodiment of the present disclosure.

FIG. 1 is a schematic diagram of a configuration of a touch panel according to a first embodiment of the present disclosure. As shown in FIG. 1, the touch screen includes a touch area 101, a plurality of emitters 102 disposed on a first side 104 of the touch area 101 (lower side in FIG. 1), and a plurality of receiver 103 disposed on a second side 105 of the touch area 101 (upper side in FIG. 1) opposite to the first side 104 of the touch area 101. Direction changing units (not shown in FIG. 1) are disposed in light ray-emitting directions of at least part of the emitters 102. For example, the direction changing units are disposed in the light ray-emitting directions of all the emitters 102. The emitter 102s are configured to emit light rays to the direction changing units for controlling or changing the emitting directions of the light rays emitted by the emitters 102 so that the light rays with different emitting directions are emitted at different time periods and the light rays with the different emitting directions are received by different receivers 103, respectively. The receivers 103 are configured to receive the light rays emitted by the emitters or the light rays emitted from the direction changing units. The light rays emitted by the emitters 102 are received by at least one corresponding receiver 103 to generate at least one light ray path. A plurality of light ray paths can generate a plurality of intersections wherein the more the light rays are, the more the generated intersections are, and the resolution of the touch screen will become higher due to the increasing of the intersections.

The output terminals of the receivers 103 are connected with a touch detection circuit and a controller (not shown) to output a detection signal, thereby achieving the positioning of a touch.

In addition to vertical light rays (i.e., the light rays in the vertical direction in FIG. 1), the touch screen according to this embodiment provides non-vertical light rays of which direction has been changed. It increases the number of the intersections, thereby increasing the resolution of the touch screen.

Figure 2:
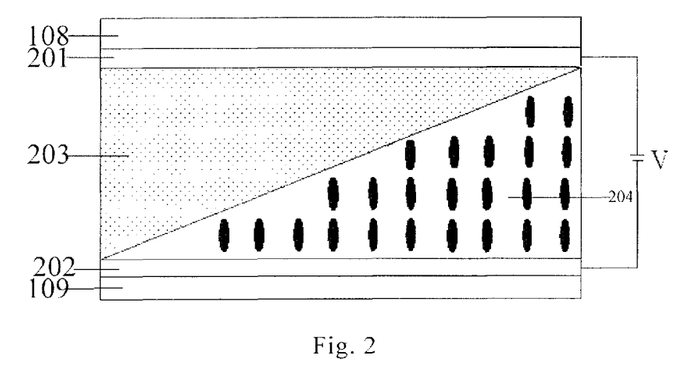
FIG. 2 is a schematic diagram of a configuration of a direction changing unit of the touch screen as shown in FIG. 1.

FIG. 2 is a schematic diagram of a configuration of an exemplary of a direction changing unit of the touch screen as shown in FIG. 1. As shown in FIG. 2, a direction changing unit comprises a first substrate 108 and a second substrate 109 which are oppositely disposed. A first electrode 201 is disposed on the first substrate 108, and a second electrode 202 is disposed on the second substrate 108. The first electrode 201 and the second electrode 202 are connected to two terminals of a power supply. A light transmitting layer 203 and a liquid crystal layer 204 are provided between the first substrate 108 and the second substrate 109, and the contact surface of the light transmitting layer 203 and the liquid crystal layer 204 is not parallel to the second substrate 109, and the direction changing unit is configured to change the emitting direction of the light rays emitted by the emitter 102.

The touch screen according to this embodiment also includes a driving circuit for driving the direction changing unit. The driving circuit is configured to apply the required voltage to the first electrode and the second electrode of the direction changing unit.

In this embodiment, the first electrode 201 and the second electrode 202 can be indium tin oxide (ITO) or other transparent conducting material. For example, a material of the light transmitting layer 203 includes polymethylacrylate or polycarbonate, and of course, can also be other light ray transmitting polymer. In practice, the first substrate 108 and the second substrate 109 are oppositely disposed to generate rectangular space with a cavity. The light transmitting layer 203 with a predetermined shape is disposed in the space and then the liquid crystal material is filled in the rest of the space for obtaining the liquid crystal layer 204. For example, the contact surface of the light transmitting layer 203 and the liquid crystal layer 204 disposed in the cavity is a diagonal plane of a cuboid. Thus, the cross section of the light transmitting layer 203 and the liquid crystal layer 204 is a triangle as shown in FIG. 2; however, this disclosure is not limited hereto. The light transmitting layer and the liquid crystal layer can both be trapezoids, for example. Of course, the contact surface is not parallel to the second substrate 109. If the contact surface is parallel to the second substrate 109, the light ray emitted by the emitter 102 will not be deflected after passing through the liquid crystal layer 203 and the light transmitting layer 204, and the propagation direction of the emitted light ray will not be changed.

In this embodiment, the direction changing unit emits the light rays with different emitting directions at different time periods, which can be jointly realized by the light transmitting layer 203 and the liquid crystal layer 204. That is, a different voltage is applied to the liquid crystal layer 204 at a different time to change the refractive index of the liquid crystal layer 204, thereby changing the emitting direction of the light ray. The operating principle of changing the emitting direction of the light ray by the direction changing unit is described hereafter.

In this embodiment, the light rays emitted by the emitter 102 include first polarized light rays which are perpendicular to the plane of the touch area and second polarized light rays parallel to the plane of the touch area. When a first voltage is applied between the first electrode 201 and the second electrode 202, the first polarized light rays and the second polarized light rays pass through the liquid crystal layer without any refraction occurring on the contact surface of the liquid crystal layer and the light transmitting layer, and directly transmit through the light transmitting layer. When a second voltage is applied between the first electrode 201 and the second electrode 202, the first polarized light rays pass through the liquid crystal layer with refraction occurring on the contact surface of the liquid crystal layer and the light transmitting layer, and the refracted first polarized light rays pass through the light transmitting layer, the second polarized light rays pass through the liquid crystal layer without any refraction occurring on the contact surface of the liquid crystal layer and the light transmitting layer, and directly transmit through the light transmitting layer.

Figure 3:
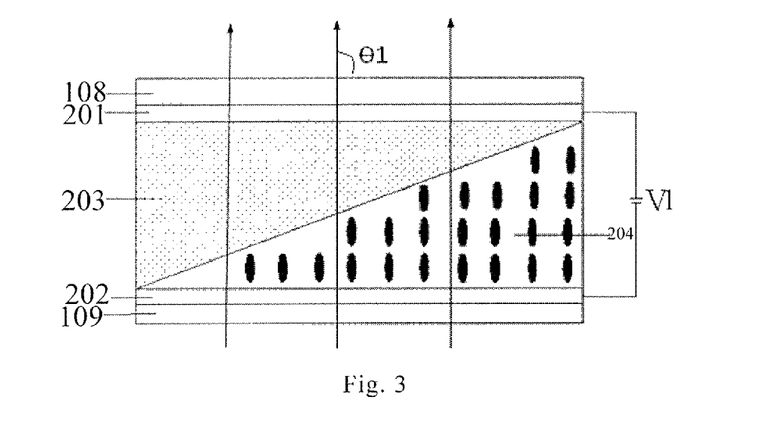
FIG. 3 is a schematic diagram for the transmitted light ray of the direction changing unit as shown in FIG. 2.

When the first voltage is applied between the first electrode 201 and the second electrode 202, the refractive index of the light transmitting layer is the same as the refractive index of the liquid crystal layer. FIG. 3 is a schematic diagram for the transmitted light ray of the direction changing unit as shown in FIG. 2. As shown in FIG. 3, in the time period T1, the power supply provides a first voltage V1, and if the refractive index of the liquid crystal layer 204 with respect to the first polarized light ray is n1, the refractive index of the liquid crystal layer 204 with respect to the second polarized light ray is n2, and the refractive index of the light transmitting layer 203 is n. In this case, n1=n2=n. If the emitting direction of the first polarized light ray is a first direction and the emitting direction of the second polarized light ray is a second direction. The first direction and the second direction are coincident and the angle between the first substrate 108 and the first direction is θ1 where θ1=90°.

Figure 4:
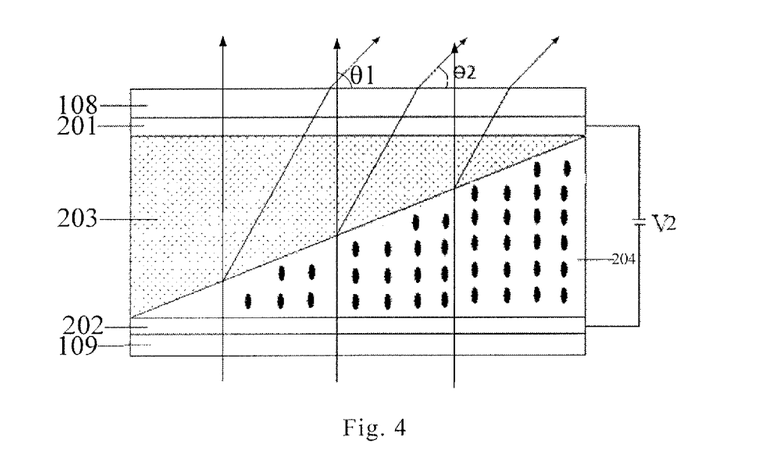
FIG. 4 is a schematic diagram of a scheme for changing an emitting direction of the light ray by the direction changing unit as shown in FIG. 2.

When the second voltage is applied between the first electrode 201 and the second electrode 202, the liquid crystal molecules in the liquid crystal layer are deflected at a plane which is perpendicular to the touch area in order to change the refractive index of the liquid crystal layer. FIG. 4 is a schematic diagram of a scheme for changing the emitting direction of the light ray by the direction changing unit as shown in FIG. 2. As shown in FIG. 4, in the time period T2, the power supply provides a second voltage V2, and the refractive index of the liquid crystal layer 204 with respect to the first polarized light ray is n1, the refractive index of the liquid crystal layer 204 with respect to the second polarized light ray is n2, and the refractive index of the light transmitting layer 203 is n. In this case, n1>n2=n. If the emitting direction of the first polarized light ray is a first direction and the emitting direction of the second polarized light ray is a second direction, the angle between the first substrate 108 and the first direction is θ2 and the angle between the first substrate 108 and the second direction is θ1 where θ1=90°.

Figure 5:
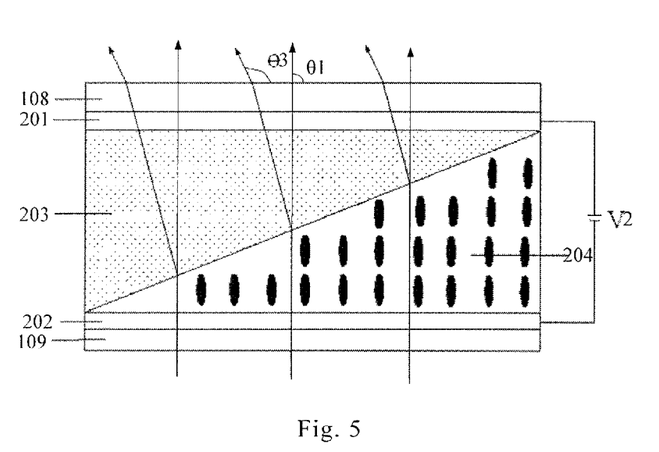
FIG. 5 is a schematic diagram of another scheme for changing the emitting direction of the light ray by the direction changing unit as shown in FIG. 2.

FIG. 5 is a schematic diagram of another scheme for changing the emitting direction of the light ray by the direction changing unit as shown in FIG. 2. As shown in FIG. 5, in the time period T3, the power supply provides the second voltage V2, and the refractive index of the liquid crystal layer 204 with respect to the first polarized light ray is n1, the refractive index of the liquid crystal layer 204 with respect to the second polarized light ray is n2, and the refractive index of the light transmitting layer 203 is n. In this case, n1<n2=n. If the emitting direction of the first polarized light ray is a first direction and the emitting direction of the second polarized light ray is a second direction, the angle between the first substrate 108 and the first direction is θ3 and the angle between the first substrate 108 and the second direction is θ1 where θ1=90° and θ3>θ1>θ2.

According to the principle of changing the emitting direction of the light ray passed through the liquid crystal layer 204 and the light transmitting layer 203 as described above, the light ray can be emitted in a different emitting direction at a different time period after passing through the direction changing unit. A voltage value of the second voltage and positions of the emitter 103 and the receiver 102 are preset, so that the light ray emitted by the emitter 102 is just received at the receiver 103 when the voltage value is applied.

In the touch screen provided by this embodiment, at least part of the emitters are provided with the direction changing units for controlling or changing the emitting direction of light ray emitted by the emitter, and the light ray with a different emitting direction is emitted at a different time and the light ray with the different emitting direction is received by a different receiver. Therefore, in addition to the intersections of horizontal light rays and vertical light rays, the touch area further has intersections generated between non-horizontal and non-vertical light rays of which directions have been changed and between the non-horizontal and non-vertical light rays and the horizontal light rays and vertical light rays. It increases the number of the intersections of the light rays, thereby increasing the resolution of the touch screen.

Second Embodiment

Figure 6:
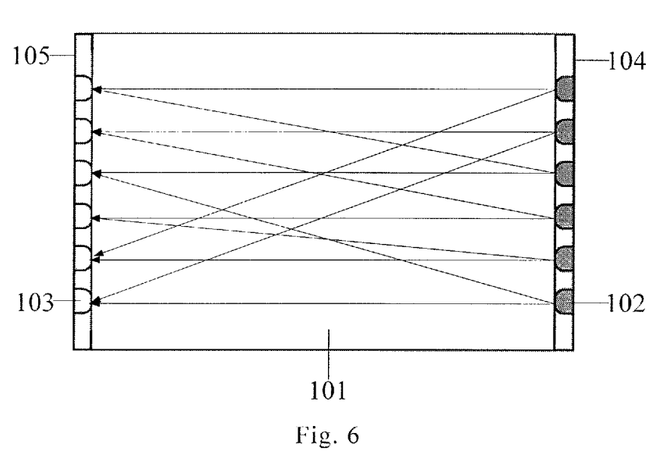
FIG. 6 is a schematic diagram of a configuration of a touch screen according to a second embodiment of the present disclosure.

FIG. 6 is a schematic diagram of a configuration of a touch panel according to a second embodiment of the present disclosure. As shown in FIG. 6, the touch screen includes a touch area 101, a plurality of emitters 102 disposed on a first side 104 of the touch area 101 (left side in FIG. 6), and a plurality of receiver 103 disposed on a second side 105 of the touch area 101 (right side in FIG. 6) opposite to the first side 104 of the touch area 101. Direction changing units (not shown in FIG. 6) are disposed in the light ray-emitting directions of at least part of the emitters 102. For example, the direction changing units are disposed in the light ray-emitting directions of all the emitters 102.

In this embodiment, the direction changing unit substantially similar to that in the first embodiment is disposed in the light ray-emitting direction of the emitter 102 and thus the specific content can refer to the description in the first embodiment and will be omitted here.

The difference in this embodiment from the first embodiment is that the touch screen according to this embodiment is laterally provided with the emitter 102 and the receiver 103 and the touch screen according to the first embodiment is longitudinally provided with the emitter 102 and the receiver 103. The emitter 102 is configured to emit light rays to the direction changing unit for controlling or changing the emitting direction of the light rays emitted by the emitter 102, and the light rays with different emitting directions are emitted at different time periods and the light rays with the different emitting direction are emitted to the different receivers 103 for receiving the light rays emitted from the direction changing units. In addition to the horizontal light rays, the touch screen according to this embodiment further has non-horizontal light rays of which directions have been changed. It increases the number of the intersections of the light rays, thereby increasing the resolution of the touch screen.

In the touch screen according to this embodiment, the direction changing units are disposed in the light ray-emitting directions of at least part of the emitters and changes emitting directions of the light rays emitted by the emitters. The at least part of the emitters emit the light rays with different emitting directions at different time periods and the light rays with different emitting directions are received by different receivers. Therefore, in addition to the intersections of the horizontal light rays and vertical light rays, the touch area has intersections generated between non-horizontal and non-vertical light rays of which directions have been changed and between the non-horizontal and non-vertical light rays and the horizontal light rays and vertical light rays. It increases the number of the intersections of the light rays, thereby increasing the resolution of the touch screen.

Third Embodiment

Figure 7:
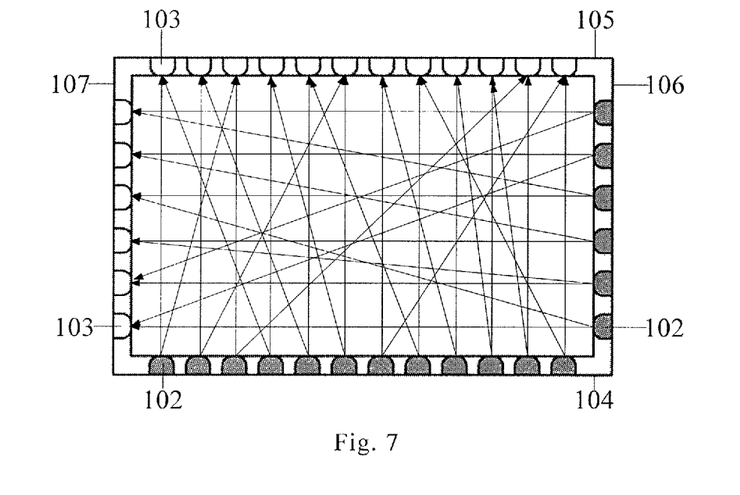
FIG. 7 is a schematic diagram of a configuration of a touch screen according to a third embodiment of the present disclosure.

FIG. 7 is a schematic diagram of a configuration of a touch screen according to a third embodiment of the present disclosure. As shown in FIG. 7, the touch screen includes a touch area 101, a plurality of emitters 102 disposed on a first side 104 (lower side in FIG. 7) and a third side 106 (right side in FIG. 7) of the touch area 101, and a plurality of receiver 103 disposed on a second side 105 (upper side in FIG. 6) and a fourth side 107 (left side in FIG. 7) of the touch area 101 where the second side 105 is disposed oppositely to the first side 104 and the third side 106 is disposed oppositely to the fourth side 107. Direction changing units (not shown) are disposed in the light ray-emitting directions of at least part of the emitters 102. For example, the direction changing units are disposed in the light ray-emitting directions of all the emitters 102.

In this embodiment, the direction changing unit substantially similar to that in the first embodiment and the second embodiment is disposed in the light ray-emitting direction of the emitter 102 and thus the specific content can refer to the description in the first embodiment and the second embodiment and will be omitted here.

The difference in this embodiment from the first embodiment and the second embodiment is that the emitters 102 according to this embodiment are disposed on the first side 104 and the third side 106 of the touch area 101, and the receivers 103 is disposed on the second side 105 and the fourth side 107 of the touch area 101. The emitters 102 are configured to emit light rays to the direction changing unit for controlling or changing the emitting directions of the light rays emitted by the emitters 102 so that the light rays with different emitting directions are emitted at different time periods and the light rays with the different emitting direction are respectively emitted to the different receivers 103 for receiving the light rays emitted from the direction changing units. The touch screen according to this embodiment is provided with the emitters on the first side and the third side of the touch area and with the receivers on the second side and the fourth side of the touch area. It increases the number of the light rays, thereby increasing the number of the intersections of the light rays. Therefore, in addition to the intersections of the horizontal light rays and vertical light rays, the touch area further includes intersections generated between non-horizontal and non-vertical light rays of which directions have been changed and between the non-horizontal and non-vertical light rays and the horizontal light rays and vertical light rays. It increases the number of the intersections of the light rays, thereby increasing the resolution of the touch screen.

In the touch screen according to this embodiment, the direction changing units are disposed in the light ray-emitting directions of at least part of the emitters and may control or change the emitting directions of light rays emitted by the emitters. The at least part of the emitters emit the light rays with different emitting directions at different time periods and the light rays with different emitting directions are received by different receivers. Therefore, in addition to the intersections of the horizontal light rays and vertical light rays, the touch area further includes intersections formed between non-horizontal and non-vertical light rays of which directions have been changed and between the non-horizontal and non-vertical light rays and the horizontal light rays and vertical light rays. It increases the number of the intersections of the light rays, thereby increasing the resolution of the touch screen.

Fourth Embodiment

The embodiment provides a touch display device including the touch screen according to the first embodiment, the second embodiment, and the third embodiment, and thus the specific content can refer to the description in the first embodiment, the second embodiment, and the third embodiment and will be omitted here.

In the touch display device according to this embodiment, the direction changing units are disposed in the light ray-emitting directions of at least part of the emitters and may control or change the emitting directions of the light rays emitted by the emitters. The at least part of the emitters emit the light rays with different emitting directions at different time periods and the light rays with different emitting directions are received by different receivers. Therefore, in addition to the intersections of the horizontal light rays and vertical light rays, the touch area further includes intersections formed between non-horizontal and non-vertical light rays of which directions have been changed and between the non-horizontal and non-vertical light rays and the horizontal light rays and vertical light rays. It increases the number of the intersections of the light rays, thereby increasing the resolution of the touch screen.

Fifth Embodiment

Figure 8:
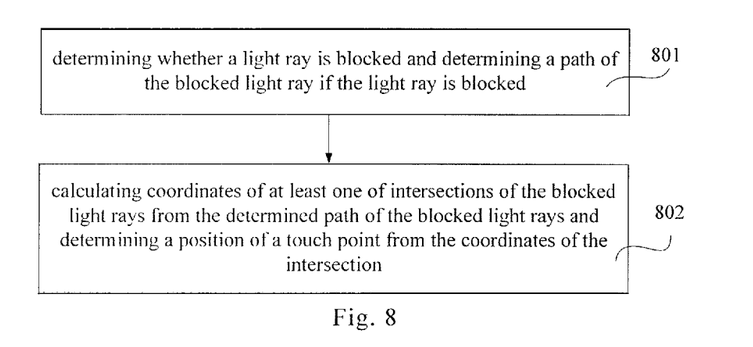
FIG. 8 is a flow chart of a positioning method for a touch screen according to a fifth embodiment of the present disclosure.

FIG. 8 is a flow chart of a positioning method for a touch screen according to a fifth embodiment of the present disclosure. As shown in FIG. 8, the touch screen includes a touch area, a plurality of emitters disposed on a first side of the touch area, a plurality of receivers disposed on a second side of the touch area opposite to the first side of the touch area, and direction changing units disposed in the light ray-emitting directions of at least part of the emitters. The positioning method comprises the following steps.

In step 801, determine whether a light ray is blocked and determine a path of the blocked light ray if the light ray is blocked.

The emitter emits light rays to the direction changing unit for controlling or changing the emitting directions of the light rays emitted by the emitter so that the light rays with different emitting directions are emitted at different time periods and each of the light rays with the different emitting direction is emitted to a different receiver. Then, the receiver receives the light ray emitted by the direction changing unit to form a light ray path. A plurality of light ray paths can generate a plurality of intersections. Thus, the more the emitted light rays are, the more the generated intersections are. When a light ray is blocked, a touch point exists. When at least two light rays are blocked, the paths of such two light rays are determined according to the emitter and the receiver corresponding to the two light rays.

In step 802, calculate the coordinates of at least one of intersections of the blocked light rays from the determined path of the blocked light ray and determine a position of a touch point from the coordinates of the intersection.

The coordinates of the intersections of the above two light rays can be calculated according to the path of the two light rays determined above and the coordinates of the emitter and the receiver of the above two light rays, thereby the position of the touch point can be calculated. In this embodiment, one touch point may block paths of a plurality of light rays to generate a plurality of intersections. In this case, the position of the touch point can be calculated by calculating the coordinates of any one of the intersections. Or the position of the touch point can be calculated by taking the average value of the coordinates of the intersections after calculating the coordinates of the plurality of the intersections.

In addition, when a plurality of touch points are blocked at the same time so as to generate a plurality of intersections, the coordinates of these intersections may be calculated respectively since one touch point corresponds to one intersection. And then, the positions of a plurality of touch points may be calculated respectively according to the one-to-one corresponding relationship between the intersection point and the touch point to implement a multiple touching.

Figure 9:
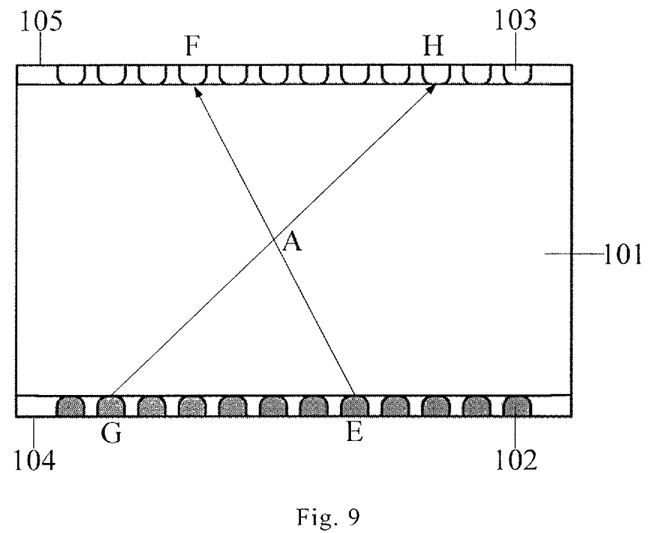
FIG. 9 is a reference view for calculation of coordinates of a touch point in the positioning method for the touch screen as shown in FIG. 8.

The following example shows how to calculate the position of a touch point. FIG. 9 is a reference view for calculation of coordinates of a touch point in the positioning method for the touch screen as shown in FIG. 8.

As shown in FIG. 9, a touch point A is blocked by a light ray EF and a light ray GH, where the light ray EF corresponds to an emitter E and a receiver F, the light ray GH corresponds to an emitter G and a receiver H. The coordinates of the touch point A is (x, y), the coordinates of the emitter E is (a, m), the coordinates of the receiver F is (c, n), the coordinates of the emitter G is (b, m), the coordinates of the receiver H is (d, n), a−b−c+d≠0. When a−b−c+d=0, the light ray EF and the light ray GH are parallel without any intersection.

The equation of the light ray EF may be calculated from the coordinates (a, m) of the emitter E and the coordinates (c, n) of the receiver F as follow.

$$y = \frac{m-n}{a-c}x + \frac{an-cm}{a-c},$$

with (a≠c).

The equation for the light ray GH may be calculated from the coordinates (b, m) of the emitter G and the coordinates (d, n) of the receiver H as follow.

$$y = \frac{m-n}{b-d}x + \frac{bn-dm}{b-d},$$

with (b≠d).

The coordinates for the touch point A can be calculated by the equation for the light ray EF and the equation for the light ray GH as follows.

$$x = \frac{ad-bc}{a-b-c+d},$$
$$y = \frac{an-bn-cm+dm}{a-b-c+d}.$$

Figure 10:
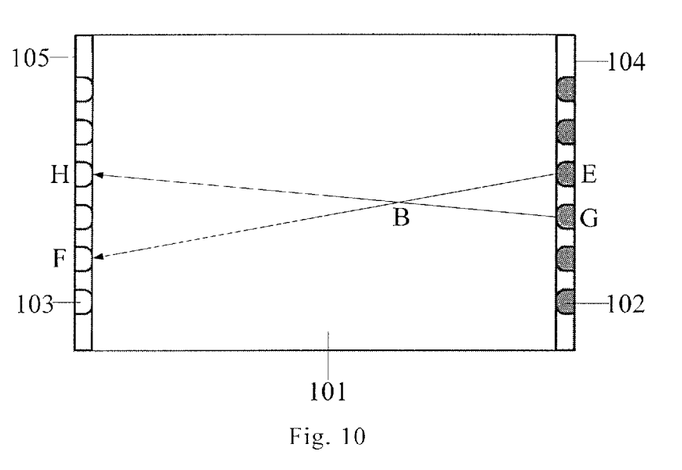
FIG. 10 is a reference view for another calculation of coordinates of a touch point in the positioning method for the touch screen as shown in FIG. 8.

FIG. 10 is a reference view for another calculation of coordinates of a touch point in the positioning method for the touch screen as shown in FIG. 8.

As shown in FIG. 10, a touch point B is blocked by a light ray EF and the light ray GH where the light ray EF corresponds to an emitter E and a receiver F and the light ray GH corresponds to an emitter G and a receiver H. If the coordinates of the touch point B is (x, y), the coordinates of the emitter E is (m, a), the coordinates of the receiver F is (n, c), the coordinates of the emitter G is (m, b), the coordinates of the receiver H is (n, d), a−b−c+d≠0. When a−b−c+d=0, the light ray EF and the light ray GH are parallel without any intersection.

The equation for the light ray EF may be calculated from the coordinates (m, a) of the emitter E and the coordinates (n, c) of the receiver F as follow.

$$y = \frac{a-c}{m-n}x + \frac{cm-an}{m-n},$$

with (m≠n).

The equation for the light ray GH may be calculated from the coordinates (m, b) of the emitter G and the coordinates (n, d) of the receiver H as follow.

$$y = \frac{b-d}{m-n}x + \frac{dm-bn}{m-n},$$

with (m≠n).

The coordinates of the touch point B can be calculated by the equation for the light ray EF and the equation for the light ray GH as follows.

$$x = \frac{an - bn - cm + dm}{a - b - c + d},$$
$$y = \frac{ad - bc}{a - b - c + d}.$$

In the positioning method for the touch screen according to this embodiment, the direction changing units are provided in the light ray-emitting direction of at least part of the emitters and may control or change the emitting directions of light rays emitted by the emitter so that the light rays with different emitting directions are emitted at different time periods and the light rays with the different emitting directions are received by different receivers. Therefore, in addition to the intersections of the horizontal light rays and vertical light rays, the touch area further includes intersections generated between non-horizontal and non-vertical light rays of which directions have been changed and between the non-horizontal and non-vertical light rays and the horizontal light rays and vertical light rays. It increases the number of the intersections of the light rays, thereby increasing the resolution of the touch screen.

What are described above is related to the illustrative embodiments of the disclosure only and not limitative to the scope of the disclosure and the scopes of the disclosure are defined by the accompanying claims.

This application claims a priority of Chinese patent application No. 201410432053.0 filed on Aug. 28, 2014, which is entirely incorporated herein by reference as a part of this application.

The invention claimed is:

1. A touch screen, comprising:
   a touch area;
   a plurality of emitters, which are disposed on a first side of the touch area; and
   a plurality of receivers, which are disposed on a second side of the touch area opposite to the first side of the touch area;
   direction changing units being disposed in the light ray-emitting directions of at least part of the emitters,
   wherein the emitters are configured to emit light rays,
   wherein the direction changing units are configured to change emitting directions of light rays emitted by the emitters so that the light rays with different emitting directions are emitted at different time periods and the light rays with the different emitting directions are emitted to different receivers, and
   wherein the receivers are configured to receive the light rays emitted by the emitters;
   wherein the direction changing units each comprise a first substrate and a second substrate which are oppositely disposed,
   wherein a first electrode is disposed on the first substrate, a second electrode is disposed on the second substrate, a light transmitting layer and a liquid crystal layer are disposed between the first substrate and the second substrate, and a contact surface of the light transmitting layer and the liquid crystal layer is not parallel to the second substrate.

2. The touch screen of claim herein the emitters are further disposed on a third side of the touch area, and the receivers are further disposed on a fourth side of the touch area opposite to the third side.

3. The touch screen of claim 1, wherein the light rays emitted by the emitters comprise first polarized light rays which are perpendicular to the plane of the touch area and second polarized light rays which are parallel to the plane of the touch area.

4. The touch screen of claim 3, wherein, when a first voltage is applied between the first electrode and the second electrode, the first polarized light rays and the second polarized light rays pass through the liquid crystal layer without any refraction occurring on the contact surface of the liquid crystal layer and the light transmitting layer, and directly transmit through the light transmitting layer; or
   when a second voltage is applied between the first electrode and the second electrode, the first polarized light rays passes through the liquid crystal layer with refraction occurring on the contact surface of the liquid crystal layer and the light transmitting layer, and the refracted first polarized light rays pass through the light transmitting layer, the second polarized light rays pass through the liquid crystal layer without any refraction occurring on the contact surface of the liquid crystal layer and the light transmitting layer, and directly transmit through the light transmitting layer.

5. The touch screen of claim 4, wherein, when the first voltage is applied between the first electrode and the second electrode, the refractive index of the light transmitting layer is the same as the refractive index of the liquid crystal layer.

6. The touch screen of claim 4, wherein, when the second voltage is applied between the first electrode and the second electrode, the liquid crystal molecules in the liquid crystal layer are deflected at a plane which is perpendicular to the touch area in order to change the refractive index of the liquid crystal layer.

7. The touch screen of claim 1, wherein a material of the light transmitting layer comprises polymethylacrylate or polycarbonate.

8. A touch display device comprising the touch screen according to claim 1.

9. A positioning method for a touch screen including a touch area, a plurality of emitters disposed on a first side of the touch area, a plurality of receivers disposed on a second side of the touch area opposite to the first side of the touch area, and direction changing units disposed in the light ray-emitting directions of at least part of the emitters, the emitters are configured to emit light rays, the direction changing units are configured to change emitting directions of light rays emitted by the emitters so that the light rays with different emitting directions are emitted at different time periods and the light rays with the different emitting directions are emitted to different receivers, and the receivers are configured to receive the light rays emitted by the emitters, the direction changing units each comprise a first substrate and a second substrate which are oppositely disposed, a first electrode is disposed on the first substrate, a second electrode is disposed on the second substrate, a light transmitting layer and a liquid crystal layer are disposed between the first substrate and the second substrate, and a contact surface of the light transmitting layer the liguid crystal layer is not parallel to the second substrate, the method comprising:
   determining whether a light ray is blocked and, if the light ray is blocked, determining a path of the blocked light ray; and calculating coordinates of at least one of intersections between blocked light rays from the determined paths of the blocked light rays and determining a position of a touch point from the coordinates of the at least one of intersections.

10. The positioning method for the touch screen of claim 9, wherein a calculating formula for calculating the coordinates of the intersections of the blocked light rays from the determined paths of the blocked light rays is as follow.

$$x = \frac{ad - bc}{a - b - c + d},$$
$$y = \frac{an - bn - cm + dm}{a - b - c + d}$$

where the coordinates of the intersection are (x, y), the coordinates of the emitter corresponding to one of paths of the blocked light rays is (a, m), the coordinates of the corresponding receiver is (c, n), the coordinates of the emitter corresponding to the other of paths of the blocked light rays is (b, m), the coordinates of the corresponding other receiver is (d, n), with a−b−c+d≠0.

11. The positioning method for the touch screen of claim 9, wherein a calculating formula for calculating the coordinates of the intersection of the blocked light rays from the determined paths of the blocked light rays is as follow $$x = \frac{an - bn - cm + dm}{a - b - c + d},$$
$$y = \frac{ad - bc}{a - b - c + d}$$

where the coordinates of the intersection is (x, y), the coordinates of the emitter corresponding to one of paths of the blocked light rays is (m, a), the coordinates of the corresponding receiver is (n, c), the coordinates of the emitter corresponding to the other of paths of the blocked light rays is (m, b), the coordinates of the corresponding other receiver is (n, d), with a−b−c+d≠0.

* * * * *